No. 858,360. PATENTED JUNE 25, 1907.
J. CLARK.
CLAMPING RING FOR PIPE COUPLINGS.
APPLICATION FILED DEC. 3, 1906.

2 SHEETS—SHEET 1.

WITNESSES
INVENTOR
James Clark
BY Whitaker Prevost
Attorneys

No. 858,360.  
PATENTED JUNE 25, 1907.
J. CLARK.
CLAMPING RING FOR PIPE COUPLINGS.
APPLICATION FILED DEC. 3, 1906.
2 SHEETS—SHEET 2.
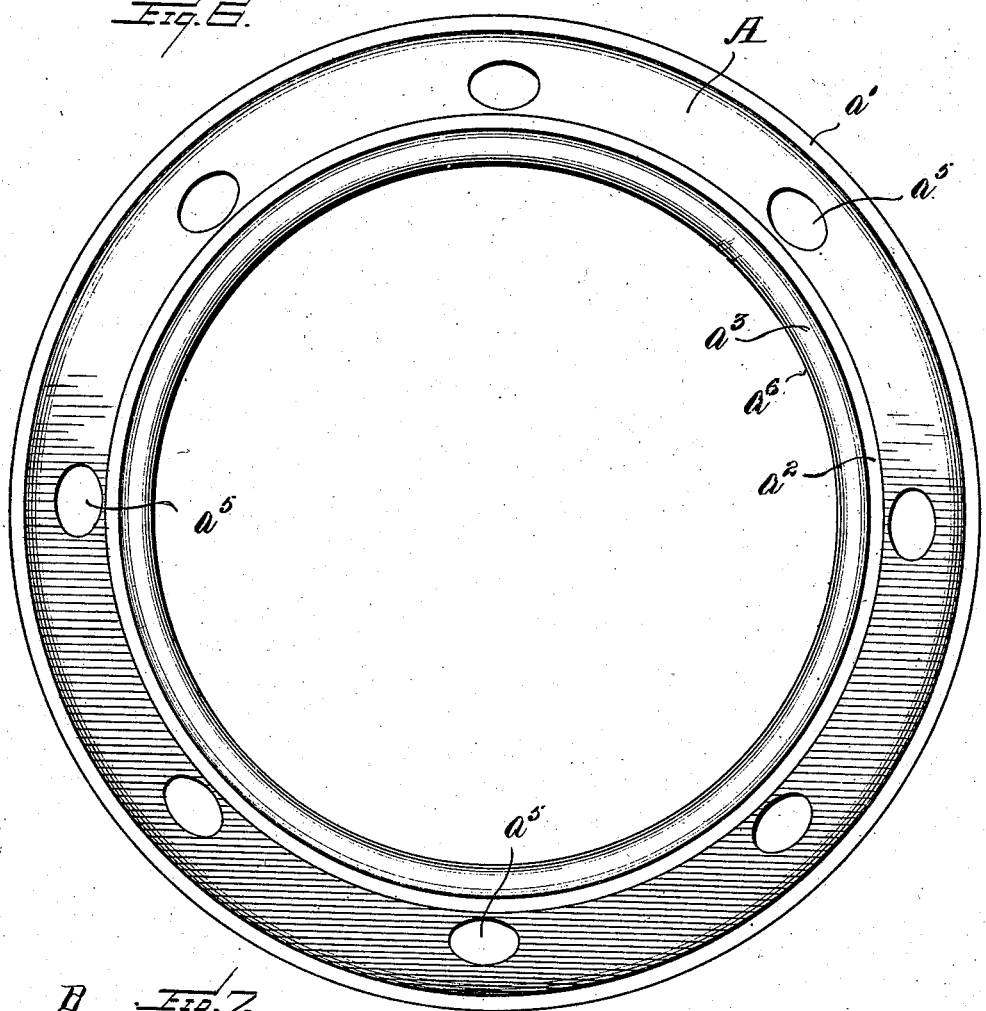
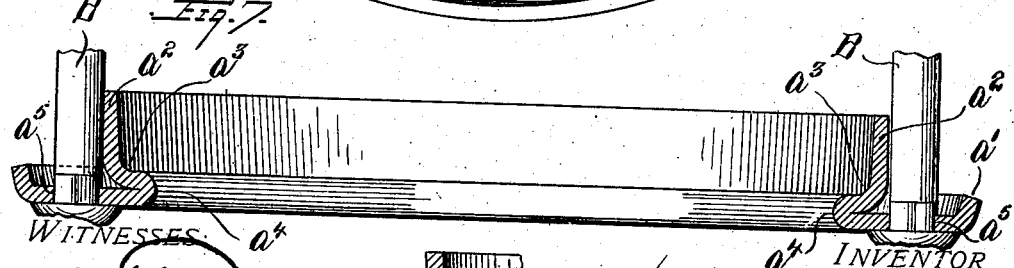

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA.

CLAMPING-RING FOR PIPE-COUPLINGS.

No. 858,360.　　　　Specification of Letters Patent.　　　Patented June 25, 1907.

Application filed December 3, 1906. Serial No. 346,144.

*To all whom it may concern:*

Be it known that I, JAMES CLARK, a citizen of the United States, residing at Bradford, in the county of McKean and State of Pennsylvania, have invented certain new and useful Improvements in Clamping-Rings for Pipe-Couplings; and I do hereby declare the following to be a full, clear, and exact description of the invention, such as will enable others skilled in the art to which it appertains to make and use the same.

My invention consists in the novel features hereinafter described reference being had to the accompanying drawings which illustrate one form in which I have contemplated embodying my invention and said invention is fully disclosed in the following description and claims.

Figure 1:
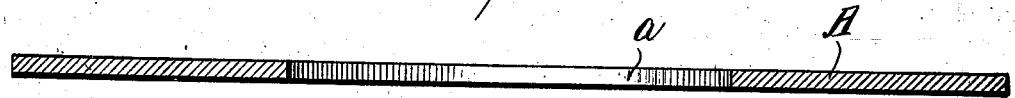
Figure 2:
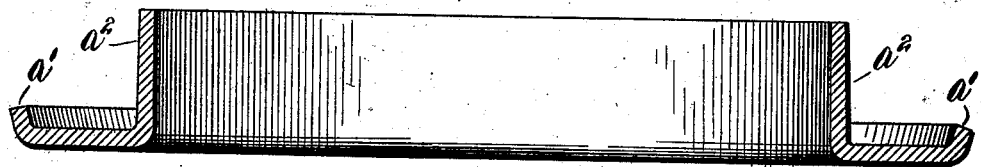
Figure 3:
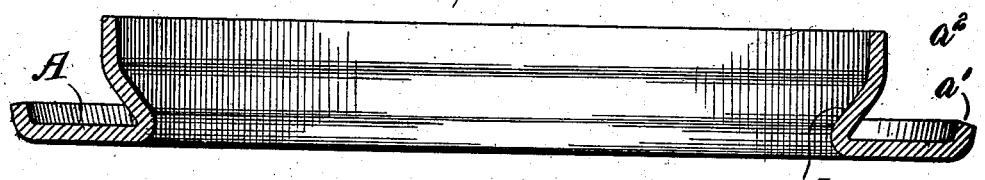
Figure 4:
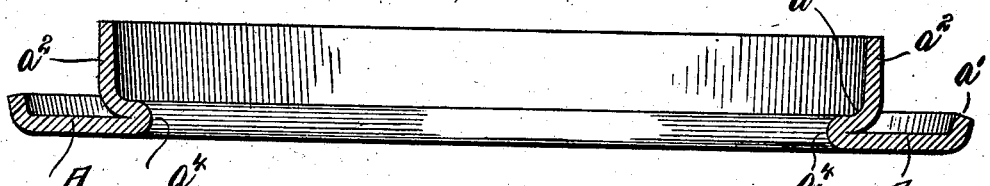
Figure 5:
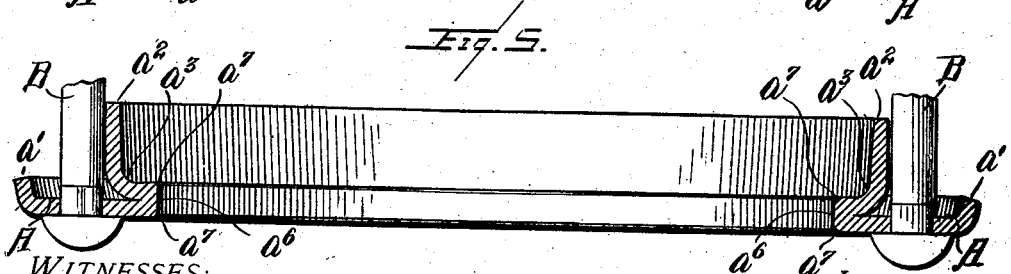

Referring to the said drawings, Figure 1 represents a sectional view of the blank from which the clamping ring is made. Fig. 2 is a sectional view of the blank after the first step or operation thereon for the production of my improved clamping ring. Fig. 3 is a similar view of the blank after the second operation. Fig. 4 is a similar view after the third operation. Fig. 5 is a sectional view of the completed clamping ring. Fig. 6 is a top plan view of the completed clamping ring. Fig. 7 is a sectional view of a slightly modified form of clamping ring. Fig. 8 is a partial sectional view showing another slight modification.

My invention consists in a "flange" or clamping ring for pipe couplings, and is designed particularly for use with that class of pipe couplings in which a packing ring of rubber or other suitable material is compressed to form a tight joint.

My invention has for its object to produce a clamping ring which is made in one piece from wrought metal, such as wrought iron or steel in which the construction of the device provides an annular flange member forming a packing recess for receiving a packing ring and a flat plate member having bolt holes therein, so arranged that the part of the flange member containing the packing recess is reinforced by the plate member and vice versa so as to produce a light yet extremely strong and durable article, suitable under all conditions and in all sizes for use in underground pipe lines or other pipe lines in which its use may be found desirable.

In order that the construction of my improved clamping ring may be clearly understood I have illustrated in the accompanying drawings a blank from which my improved clamping ring may advantageously be made and the changes in the form which this blank undergoes in the production of the finished article. The clamping ring may, however, be produced in other ways and from a different form of blank.

In the drawings A (Fig. 1) represents the blank which I have found it convenient to employ and which is a flat ring or in other words an annular plate having a concentric central aperture $a$. This blank is operated upon either by rolling, or forging or by suitable dies and while the blank is in a heated condition or cold, as may be found most desirable or effective, until the final form hereinafter described is attained. The marginal portions adjacent to the exterior edge of the blank or ring A are bent until nearly or quite perpendicular to the plane of the blank as shown at $a'$ forming an exterior annular reinforcing flange. The interior marginal portions $a^2$ including nearly one half the diameter of the ring or blank are likewise bent substantially perpendicular to the plane of the blank and on the same side as the reinforcing flange $a'$ as indicated in Fig. 2, forming an interior annular flange member $a^2$. At the same time that the flange $a^2$ is formed the metal thereof is preferably slightly drawn, so that the wall of the flange tapers slightly or in other words diminishes slightly and gradually in thickness toward the outer edge of the flange, although this is not essential. The annular flange member $a^2$ is then expanded laterally or in a direction perpendicular to the axis of the ring, the outer portions of the flange member $a^2$ being expanded substantially uniformly, and the portion adjacent to the flat plate member A assuming a position inclined to the axis of the ring as indicated at $a^3$, in Fig. 3. The blank is then operated upon so as to cause the inclined portion $a^3$ just described to assume an outward curved form, substantially quadrantal in cross section, thereby bending said part $a^3$ sharply down upon the plate member A and into contact therewith for a portion of its length, so that the flat plate member A reinforces the part $a^3$, and vice versa the part $a^3$ reinforces the flat plate member A when strain is applied to the bolts as hereinafter described. The clamping ring or flange may then be completed by forming bolt holes $a^5$ in the flat plate member A at a plurality of separated points around the same, as shown in Fig. 7, and I prefer to form the bolt holes of oval form, or elongated in one direction to receive what are known as track head bolts, although the shape of the bolt hole is not material. The bolts are indicated in Fig. 7, to illustrate the direction in which the strain is applied. In this form of my improved clamping ring or "flange" it has a rounding portion $a^4$, (Figs. 4 and 7) at its smaller internal diameter which rounding portion surrounds one of the pipes to be connected, and the curved portion $a^3$ forms a packing recess, to receive an annular packing ring.

The inner face of the annular flange $a^2$, is slightly inclined outwardly as shown in Figs. 4 and 7, while the outer face is substantially perpendicular to the plate member A, the desired inclination of the inner face being provided by the tapering of the wall of the flange, before described. I may, however, obtain this result without tapering the wall of the flange by giving the entire flange $a^2$ a very slight outward flare, so that the outer and inner walls of the flange will both be inclined outwardly to a slight degree, and in such case the taper of the flange wall $a^2$ may be omitted.

While the form of clamping ring shown in Fig. 7 is suitable for many purposes, I prefer to have the inner face of the portion which most nearly approaches the pipe, straight instead of curved, as the packing is thereby held in the packing recess, to better advantage and is prevented from being pressed through between the clamping ring and the pipe section. I, therefore, prefer to take the blank when it has reached the stage or form indicated in Fig. 4, and by rolling or forging, or by the action of suitable dies, upset the curved edge $a^4$ shown in Fig. 4 so as to produce the straight edge $a^6$ shown in Fig. 5, and at the same time produce corners above and below said face which are nearly rectangular as shown at $a^7$ $a^7$. The flange is then provided with bolt holes in the flat plate member A, see Figs. 5 and 6 as previously described and this is my preferred form of clamping ring or "flange," which is in all respects identical with the form shown in Fig. 7, except that the inner face $a^6$ is straight instead of round. The bolts are shown in Fig. 5 at B, to indicate the direction of the strain upon the clamping ring.

In the form shown in Figs. 5 and 6, the inner wall of the flange $a^2$ is inclined outwardly toward its edge, as shown, in Fig. 5, while the outer wall is substantially perpendicular to the plate member A, but as previously stated with reference to the form shown in Fig. 7, the wall of the flange $a^2$ need not be tapered, and both inner and outer walls thereof may be inclined outwardly to a slight degree, if desired.

What I claim and desire to secure by Letters Patent is:—

1. A clamping ring for pipe couplings comprising a flat plate member disposed perpendicularly to the axis of the ring and provided with a central pipe aperture, and an annular flange member extending from the edge of said pipe aperture outwardly, and then substantially perpendicularly to said plate member, to form a packing recess, substantially as described.

2. A clamping ring for pipe couplings comprising a flat plate member, disposed perpendicularly to the axis of the clamping ring and provided with a central pipe aperture, and an annular flange member, extending from the edge of said pipe aperture outwardly and then substantially perpendicularly to the plate member, the outwardly extending portion of the flange member having portions in contact with the plate member, whereby said flange member and plate member reinforce each other, substantially as described.

3. A clamping ring for pipe couplings formed in one piece, of wrought metal, comprising a plate member disposed perpendicularly to the axis of the clamping ring and provided with a central pipe aperture, and a flange member, bent sharply back from the edge of said aperture, and extending outwardly therefrom, and then substantially perpendicularly to said plate member, substantially as described.

4. A clamping ring for pipe couplings formed in one piece, of wrought metal, comprising a plate member disposed perpendicularly to the axis of the clamping ring and provided with a central pipe aperture, and a flange member, bent sharply back from the edge of said aperture and having annular curved portions extending outwardly from said aperture, an annular portion extending from said curved portions substantially perpendicularly to said plate member, substantially as described.

5. A clamping ring for pipe couplings formed in one piece, of wrought metal, comprising a plate member disposed perpendicularly to the axis of the clamping ring and provided with a central pipe aperture, and a flange member, bent sharply back from the edge of said aperture and having annular portions extending outwardly from said aperture and annular portions disposed substantially perpendicularly to said plate member, said outwardly extending portions of the flange member being in direct contact with portions of the plate member surrounding said pipe aperture whereby said plate and flange members mutually reinforce each other, substantially as described.

6. A clamping ring for pipe couplings, formed in one piece from wrought metal, and having a flat plate member disposed perpendicularly to the axis of the clamping ring and provided with a pipe aperture, and an annular flange member bent sharply back from the inner edge of said aperture, and being curved outwardly and then extending substantially perpendicularly to the plate member to form a packing recess, said curved portion of the flange member being in direct contact with the plate member adjacent to the inner edge thereof whereby said flange member and said plate member mutually reinforce each other, the inner edge of said flange member and said plate member at their union, being substantially parallel to the axis of the clamping ring, substantially as described.

7. A clamping ring for pipe couplings formed in one piece, from wrought metal, having a plate member disposed perpendicularly to the axis of the clamping ring and provided with a central pipe aperture and at its outer edge with an annular reinforcing flange, and an annular flange member bent sharply back from the inner edge of said plate member on the same side as the reinforcing flange, and having a curved portion lying for part of its length in contact with the plate member, and a portion extending substantially perpendicularly to the said plate member to form a packing recess, substantially as described.

8. A clamping ring for pipe couplings formed in one piece, from wrought metal, and having a flat annular plate member disposed perpendicularly to the axis of the clamping ring and an annular flange member extending sharply outwardly from the inner edge of the said plate member, and then substantially perpendicularly to the said plate member, the inner face of the said flange member inclining slightly outwardly toward its outer edge, substantially as described.

In testimony whereof I affix my signature, in the presence of two witnesses.

JAMES CLARK.

Witnesses:
 ALLEN E. CONANT,
 H. M. WICK.